(12) United States Patent
Arangalage et al.

(10) Patent No.: US 12,529,613 B2
(45) Date of Patent: Jan. 20, 2026

(54) INSTRUMENT FOR MEASURING THE FORCE FOR SPREADING A PASTE (71) Applicants: SAINT-GOBAIN WEBER FRANCE, Sucy-en-Brie (FR); SAINT-GOBAIN PLACO, Courbevoie (FR)

(72) Inventors: Mélanie Arangalage, Paris (FR); Julien Beaumont, Paris (FR); Raül Leiva Munoz, Barcelone (ES); Luis Cardoso Da Silva, Aveiro (PT)

(73) Assignees: SAINT-GOBAIN WEBER FRANCE, Sucy-en-Brie (FR); SAINT-GOBAIN PLACO, Courbevoie (FR)

( * ) Notice: Subject to any disclaimer, the term of this patent is extended or adjusted under 35 U.S.C. 154(b) by 306 days.

(21) Appl. No.: 18/255,273

(22) PCT Filed: Nov. 30, 2021

(86) PCT No.: PCT/FR2021/052142
§ 371 (c)(1),
(2) Date: May 31, 2023

(87) PCT Pub. No.: WO2022/117944
PCT Pub. Date: Jun. 9, 2022

(65) Prior Publication Data
US 2024/0027289 A1    Jan. 25, 2024

(30) Foreign Application Priority Data
Dec. 1, 2020 (FR) ........................................ 2012470

(51) Int. Cl.
*E04F 21/16* (2006.01)
*G01C 19/44* (2006.01)
(Continued)

(52) U.S. Cl.
CPC ............ *G01L 5/008* (2013.01); *E04F 21/161* (2013.01); *G01C 19/44* (2013.01); *G01G 19/56* (2013.01); *G01L 1/048* (2013.01)

(58) Field of Classification Search
None
See application file for complete search history.

(56) References Cited

U.S. PATENT DOCUMENTS

| | | | | |
|---|---|---|---|---|
| 5,541,855 | A * | 7/1996 | Enzler | G01N 11/14 73/803 |
| 2004/0022581 | A1 * | 2/2004 | Corbitt | E04F 21/245 404/112 |
| 2020/0109572 | A1 * | 4/2020 | Carli | G01N 33/383 |

FOREIGN PATENT DOCUMENTS

WO    WO-2017097954 A1 *  6/2017  ............. G01N 11/10

OTHER PUBLICATIONS

International Search Report as issued in International Patent Application No. PCT/FR2021/052142, dated Mar. 2, 2022.

* cited by examiner

*Primary Examiner* — Mark A Shabman
(74) *Attorney, Agent, or Firm* — Pillsbury Winthrop Shaw Pittman LLP (57) ABSTRACT

An instrument for determining the spreading capacity of a coating or a surface, including a plate on which a gripping system is secured, the tool including a measuring system configured to measure the coating to be spread, wherein the measuring system includes at least one force sensor for generating data relating to the average force applied on the instrument, the maximum force applied on the instrument and the duration, in order to provide a signal representative of the capacity of the coating to be spread or the surface to be spread.

21 Claims, 11 Drawing Sheets

(51) Int. Cl.
*G01G 19/56* (2006.01)
*G01L 1/04* (2006.01)
*G01L 5/00* (2006.01)

INSTRUMENT FOR MEASURING THE FORCE FOR SPREADING A PASTE

CROSS-REFERENCE TO RELATED APPLICATIONS

This application is the U.S. National Stage of PCT/FR2021/052142, filed Nov. 30, 2021, which in turn claims priority to French patent application number 2012470 filed Dec. 1, 2020. The content of these applications are incorporated herein by reference in their entireties.

TECHNICAL FIELD OF THE INVENTION

The present invention relates to a tool enabling the measurement of the force or force required to spread a paste/the capacity to spread a paste, for example construction products of pasty consistency, such as in particular coatings or mortars.

TECHNOLOGICAL BACKGROUND

A coating is a paste that is deposited or finished using a tool such as a trowel: tile cement, mortar for facades, plaster, and which is used in the field of building construction or renovation. These coatings may have different functions such as a bonding function or a smoothing function or an internal or external finishing function.

These coatings therefore have different compositions depending on their usage. One of the parameters that depends on the composition is the viscosity or consistency reflected, when used, by the capacity of the coating to be spread. It is thus understood that a coating that has a low viscosity spreads less well than a coating having a higher viscosity. However, this capacity to spread has an impact to users on a daily basis.

This capacity of the coating to spread has an impact on user comfort. Indeed, the more viscous the coating will be (low viscosity), the greater the force that the user must apply via their tool to spread the coating. This necessary force will tire the operator faster or this will lead to the emergence of musculoskeletal disorders.

However, if the viscosity is too low, the coating becomes too complicated to spread because it becomes runny. Furthermore, density is another important parameter. A light paste will spread more easily than a "heavy" paste, because it will be necessary to "push" a larger weight.

There is therefore a need for an instrument for measuring the comfort of applying a coating.

SUMMARY OF THE INVENTION

One aim of the present invention is to solve the problems of the prior art by providing an instrument that makes it possible to simply determine comfort: consistency, ease of spreading a coating.

For this purpose, the present invention consists of an instrument for determining the spreading capacity of a coating or a surface, comprising a plate associated with gripping means, the instrument comprising means for measuring the coating to be spread, characterized in that the measuring means comprise at least one force sensor for generating data relating to the average force applied on the instrument, the maximum force applied on the instrument and the duration, in order to provide a signal representative of the capacity of the coating to be spread or of the surface to be coated.

One advantage of the present invention is to allow the instrument to perform measurements during the spreading of a coating in order to recover data relating to this step of spreading a coating. These data can be compared to those of other coatings of other surfaces in order to compare them.

According to one example, the gripping means comprise at least one pillar extending from the plate and a handle extending from the pillar.

According to one example, the gripping means comprising two pillars connected by the handle.

According to one example, the force sensor is a deformation gauge.

According to one example, the force sensor is arranged on or in at least one of the pillars of the gripping means.

According to one example, the force sensor is arranged on or in the plate.

According to one example, the force sensor is arranged between the plate and one of the pillars of the gripping means.

The invention further relates to a method for determining the spreading capacity of a coating or a surface comprising the following steps:
 providing a coating
 providing an instrument for determining the spreading capacity of a coating or surface comprising a plate to which gripping means are associated, the tool comprising means for measuring the coating to spread comprising at least one force sensor;
 placing the coating on the surface to be coated;
 spreading the coating using the instrument, the measuring means being capable of generating data relating to the average force applied on the instrument, the maximum force applied on the instrument, the duration;
 providing a signal representative of the capacity of the coating to be spread or of the surface to be coated.

According to one example, the measuring means are arranged to measure a mass and in that the method comprises, before the step consisting of placing the coating on the surface to be coated, a step consisting of placing the instrument in a position such that the surface area of the plate used for the spreading can be used for the temporary storage of coating, the position enabling a measurement of the mass of the temporarily stored coating.

According to one example, the measuring means are arranged to measure an inclination and in that the measuring means are able, during the step of spreading the coating, to further generate data relating to the inclination of said instrument, The invention further relates to a method for comparing the spreading capacity of different coatings comprising the following steps:
 providing at least two different coatings;
 providing a surface on which the coatings are spread;
  determining the spreading capacity of each coating by using the determination method according to the invention in order to obtain, for each coating, a signal representative of the capacity of the coating to be spread;
  comparing the signals representative of the capacity of the coatings to be spread.

The invention further relates to a method for comparing the capacity of different surfaces to be spread comprising the following steps:
 providing at least two different surfaces;
 providing a coating to be spread;
  determining the spreading capacity of each coating by using the determination method according to the invention in order to obtain, for each surface, a signal representative of the capacity of the coating to be subjected to spreading;

comparing the signals representative of the capacity of the surfaces to be subjected to spreading.

The invention further relates to using the determination method to combine at least one maximum force value and a mass value of the coating in order to determine the optimal quantity of coating to be placed on said instrument.

Alternatively, the determination method is used to combine at least one maximum force value and an inclination value of the instrument in order to prevent the instrument from being mishandled.

Alternatively, the determination method is used to generate a user profile using at least the data relating to the average force applied on said instrument, the maximum force applied on said instrument, the duration, with said profile being saved in the control unit.

According to one example, the user profile is used as a reference and compared to a subsequent measurement of at least the average force applied on said instrument, the maximum force applied on said instrument, the duration.

DESCRIPTION OF THE FIGURES

Other features and advantages will clearly emerge from the description, which is given below by way of indication and which is in no way limiting, with reference to the appended drawings, in which.

DETAILED DESCRIPTION

Figure 1:
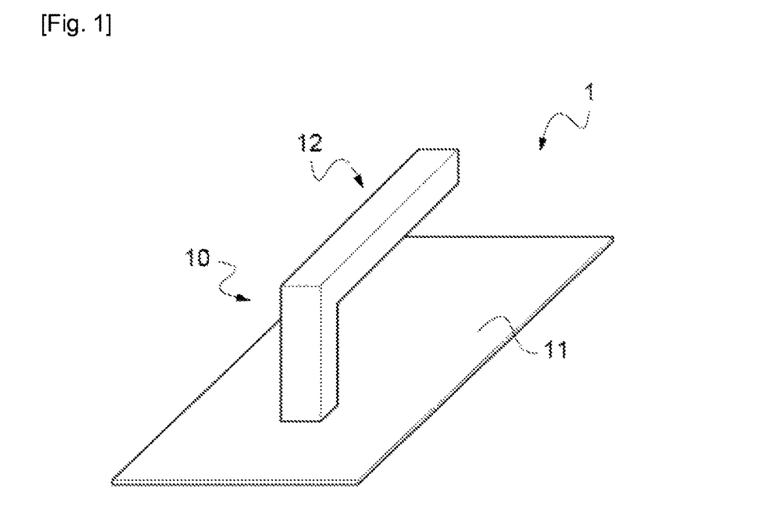
FIGS. 1 and 2 show an instrument without the possibility of determining the capacity of a coating to be spread.

In FIG. 1, an instrument 1 for determining the capacity of a coating E to be spread is shown, which can provide an indication of application comfort. This coating E is a paste that is deposited using a tool for spreading, this coating possibly being a tiling cement, a mortar for facades, a plaster or a smoothing coating or an adhesive. This coating E is used in the field of construction or that of exterior or interior finishes of a building. This instrument 1 is in the form of a spreading tool 10. This instrument in the form of a spreading tool 10 comprises a plate 11 and gripping means 12. The gripping means are attached to the plate 11 or are part of the same piece as the plate.

The plate 11 is in the form of a blade 110 made of a metallic or plastic material of the polymer or rubber type. This blade 110 has a shape that can vary, that is, it may be or is inscribed in a square or rectangular or triangular shape or have any shape suitable for use.

The plate 11 extends in a first direction and a second direction. The length along the first direction is greater than the length along the second direction.

The blade 110 has a flat profile or may have a more complex profile with an inclined or curved portion.

The blade 110 optionally comprises a toothing 111 arranged at least partially on the periphery of the blade 110.

The gripping means 12 comprise at least one handle 120. This handle 120 comprises at least one pillar 121 and a handle 122, such as in the case of a trowel or a plastering trowel. Optionally, the handle 120 comprises a handle and two pillars 121 as visible in FIG. 2.

Figure 2:
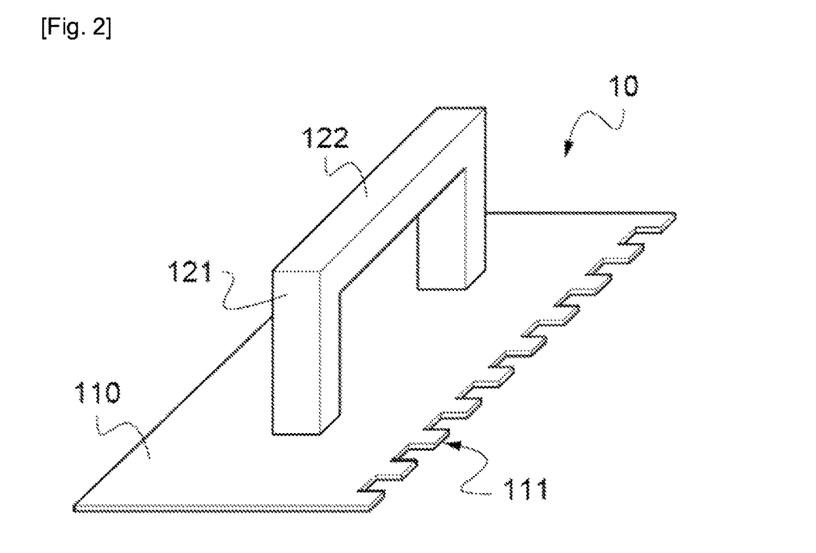

The pillar(s) 121 extend from the blade 110 forming the plate 11. This or these pillars extend orthogonally or in an inclined manner relative to the plane of the plate 12.

The handle 120 extends in the first direction of the plate 11.

In the case of a large-sized spreading tool (extending along a first dimension by more than 50 cm or 100 cm), the gripping means 12 can have different configurations. A first configuration consists of having two handles 120. These handles 120 comprise one or two pillars 121. The positioning of these handles 120 is carried out such that they extend parallel to one another.

In a second configuration, the gripping means comprise a single handle. This single handle 120 extends transversely to the length of the plate.

Figure 15:
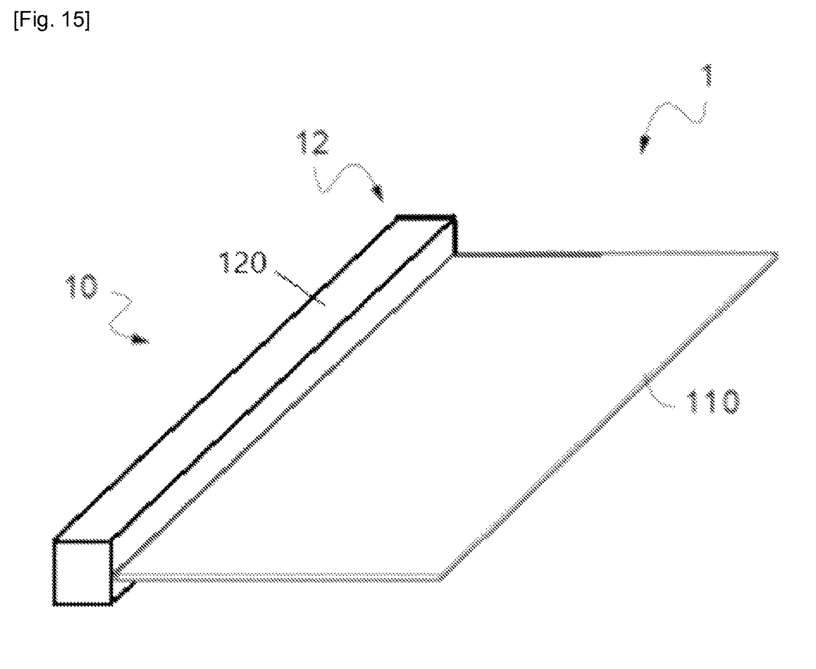
FIG. 15 shows another configuration of the instrument according to the invention.

In a configuration visible in FIG. 15, the instrument 1 comprises gripping means 12 comprising at least one handle 120 from which a blade 110 extends. The handle can extend in the continuity of the plane of the blade 110 as in the case of a putty knife or a smoothing trowel, or else form a continuous or discontinuous projection in a direction transverse to the blade 110 as in the case of a plaster float These configurations allow the operator to have better grip of the tool.

Cleverly according to the invention, the instrument 1 for determining the capacity or ease of a coating to be spread further comprises a measuring module 13. This measuring module 13 is arranged to enable measurement of the capacity of a coating E to be spread. Indeed, a coating E is intended to be applied on a surface, the coating extending so as to be the most evenly distributed, the coating is therefore spread.

This measurement of the capacity/ease of spreading is cleverly carried out by at least one force sensor 130. The force sensor 130 is arranged to measure the force exerted by the user during the spreading of the coating. Indeed, the principle is that the less easy it is to spread the coating E, the greater the force exerted for the spreading operation is. The force sensor 130 is a sensor such as a strain gauge or deformation gauge 131. This deformation gauge 131 comprises turns whose resistance varies depending on the deformation. This deformation gauge 131 can be in the form of a housing comprising the various elements of the strain gauge or in the form of a sheet bearing the metal wires and a measurement circuit connected to the sheet. This deformation gauge 131 is connected to a control unit.

Figure 3:
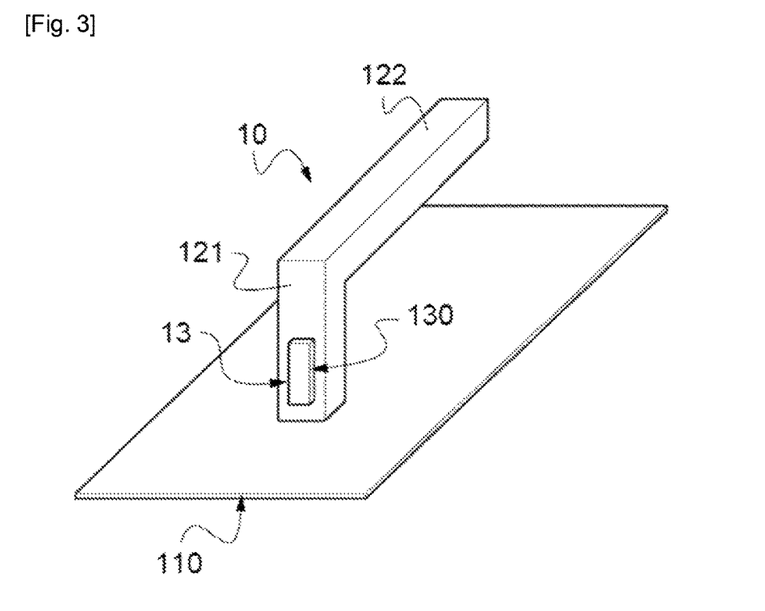
FIGS. 3 and 4 show an instrument for determining the capacity of a coating to be spread according to a first embodiment.

In a first embodiment seen in FIG. 3, the force sensor 130 is arranged on the or at least one of the pillars 121 of the gripping means. Indeed, during a coating spreading operation, the pillar(s) 121 undergo a strain that tends to deform it or them. This strain is a sum of a tangential and normal force.

Figure 10A:
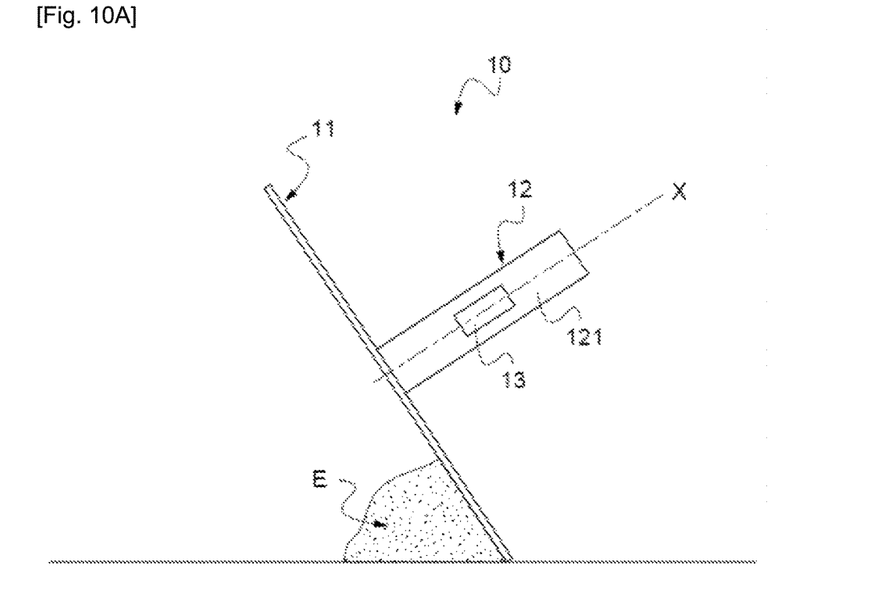
FIGS. 10a and 10b show the position of the instrument according to the first embodiment before and during the spreading step.
Figure 10B:
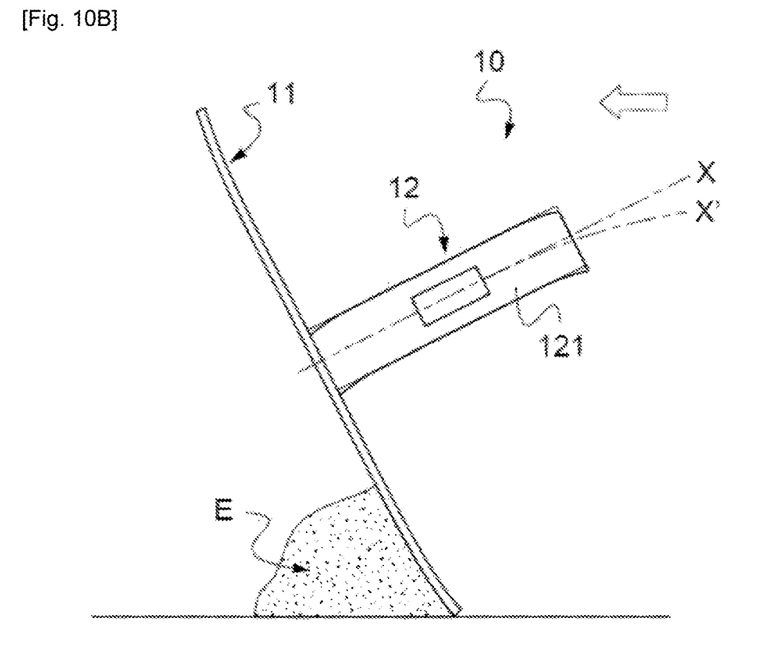

The deformation gauge 131 is then placed on at least one pillar 121 so as to be able to detect the resultant force of the tangential force and normal force exerted on said pillar. The amplitude of this resultant force is representative of the force exerted by the user such that the higher this amplitude is, the less easy the coating is to spread. This can be seen in FIGS. 10a and 10b. FIG. 10a shows the instrument 1 according to the invention placed in a spread position while FIG. 10b shows this same instrument subjected to the user's strain. FIG. 10a shows the axis X of the pillar 121. FIG. 10b shows that, under the effect of the strain exerted by the user, the axis X of the pillar becomes the angularly-offset axis X'. This offset comes from the strain which tends to twist the pillar 121. The strain gauge 131 therefore measures a torsion force.

Figure 4:
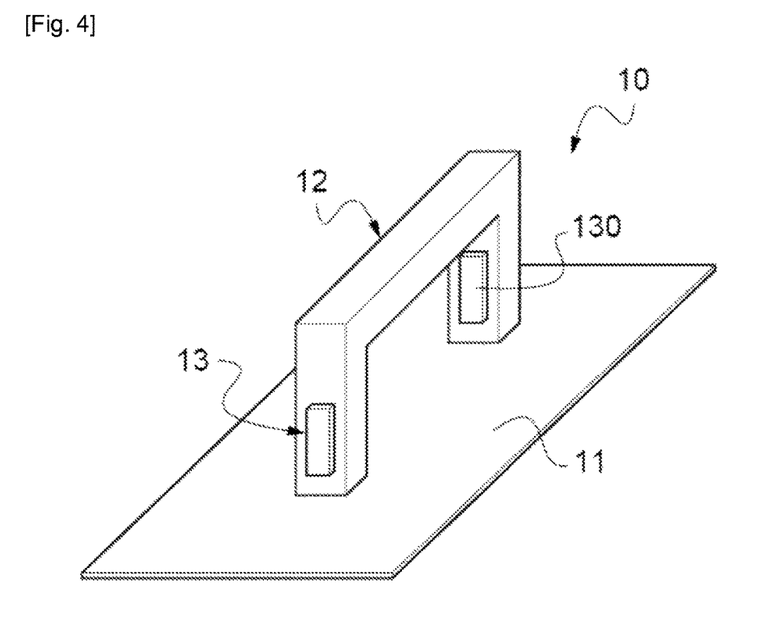

In a variant, visible in FIG. 4, in which the gripping means 12 comprise two pillars 121 and a handle 122, each pillar has a strain gauge 131. These two pillars are used for large-size tools, thus enabling better gripping. Having a strain gauge 131 per pillar makes it possible, firstly, to have a reliability effect since if a gauge 131 were to malfunction, it would be possible to detect this. Secondly, this makes it possible to analyze the user's movement. Indeed, with two strain gauges 131 placed at a distance from one another, it is possible to know the distribution of the user's force.

In another variant, the force sensor(s) 130 are arranged in the pillar(s) 121. In this case, the pillar(s) can be hollow to enable a force sensor to fit into a pillar.

In another variant, each pillar may comprise at least two strain gauges 131 to have access to the tangential force and the normal force and not only the resultant force.

Figure 5:
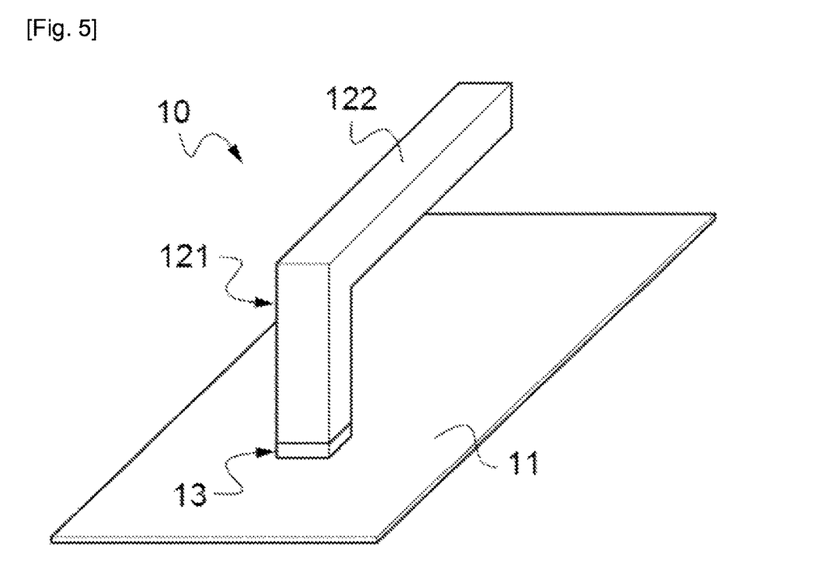
FIGS. 5 to 8 and 17 show an instrument for determining the capacity of a coating to be spread according to a second embodiment.
Figure 6:
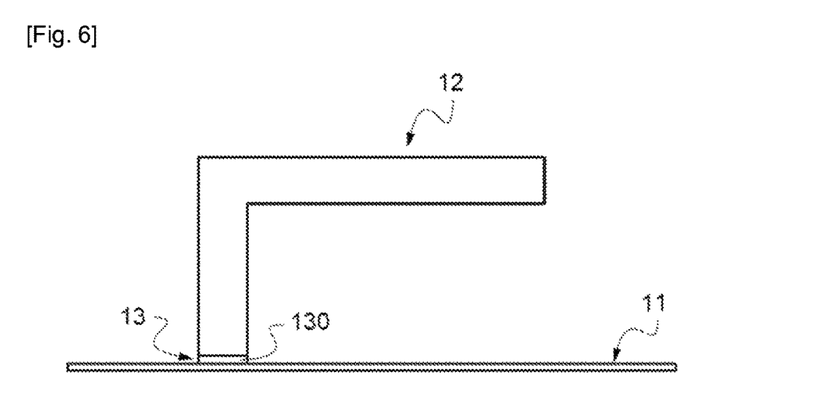

In a second embodiment visible in FIGS. 5 and 6, the strain gauge 131 is arranged at the base of at least pillar 121. Indeed, in this interface zone between the plate 11 and at least one pillar 121 of the gripping means, stresses are present during the spreading of a coating.

More specifically, the strain gauge 131 is arranged at the interface between the plate 11 and at least one pillar 121 of the gripping means.

This strain gauge 131 is then placed at the interface between the plate 11 and at least one pillar 121 of the gripping means.

Figure 17:
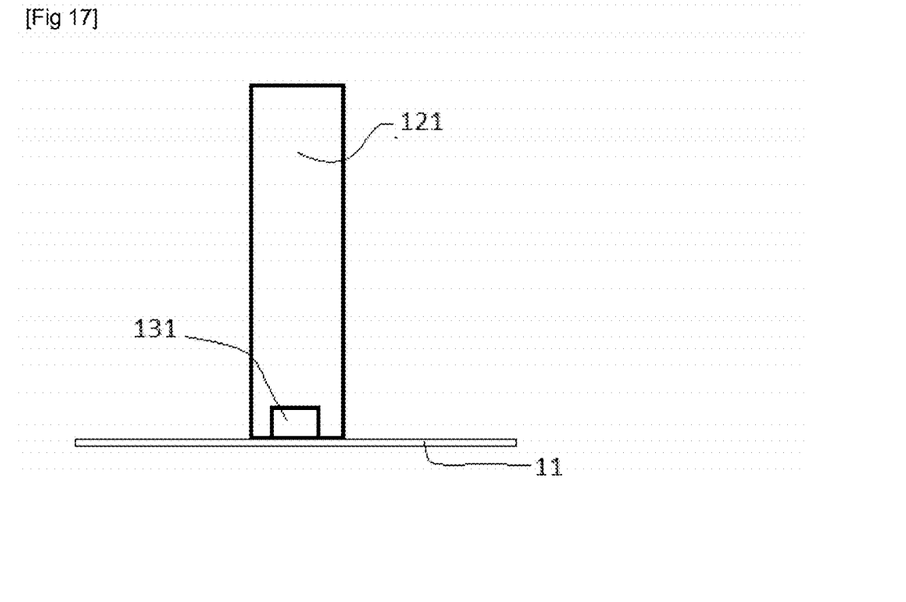

This strain gauge 131 is preferentially encapsulated in a material, for example of the plastic type, enabling the transmission of stresses to the strain gauge 131. The pillar 121 can be hollowed out and comprise a housing in which the strain gauge 131 is placed so that said strain gauge 131 is both at the interface between the pillar and the plate and in the pillar as visible in FIG. 17. Of course, the plate may also comprise a housing.

Figure 11A:
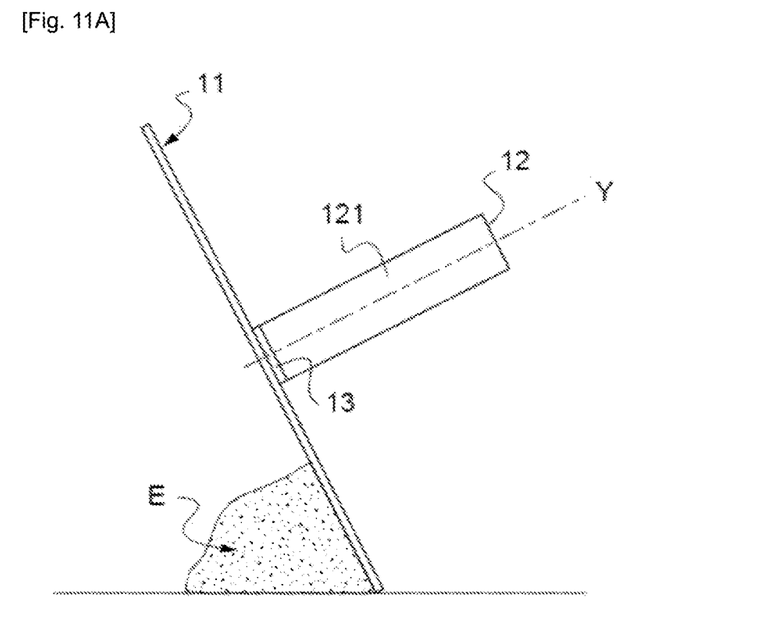
FIGS. 11a and 11b show the position of the instrument according to the second embodiment before and during the spreading step.
Figure 11B:
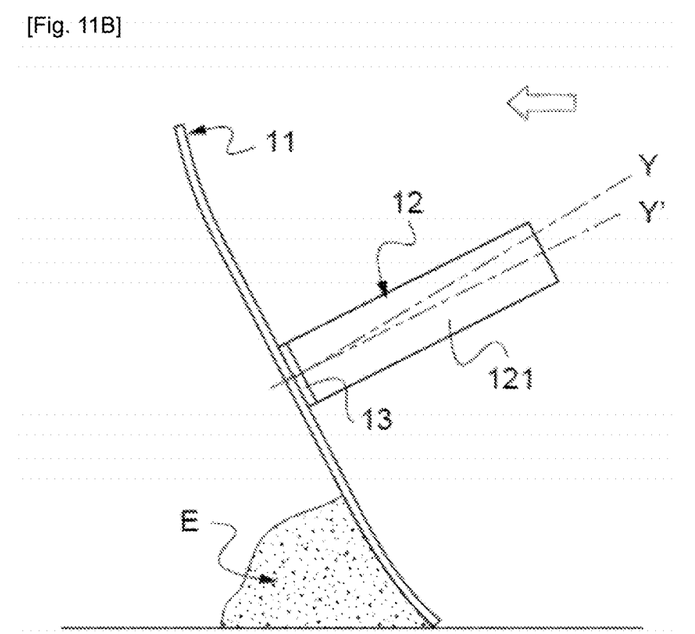

It is possible to observe the operation of the force sensor 130 of this second embodiment in FIGS. 11a and 11b. FIG. 11a shows the instrument 1 according to the invention placed in a spreading position while FIG. 11b shows this same instrument subjected to the user's strain.

FIG. 11a shows the axis Y of the pillar 121. FIG. 11b shows that, under the effect of the strain exerted by the user, the axis Y of the pillar becomes the angularly-offset axis Y'. This offset comes from the strain that tends to crush the pillar 121.

Figure 7:
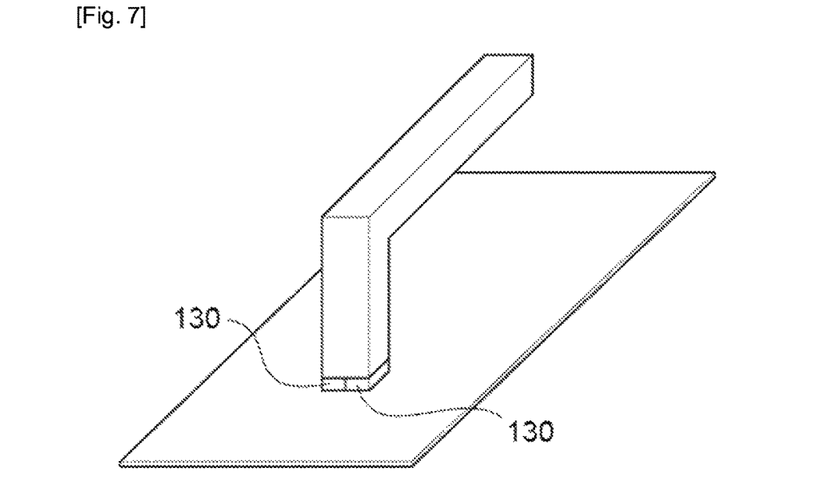
Figure 8:
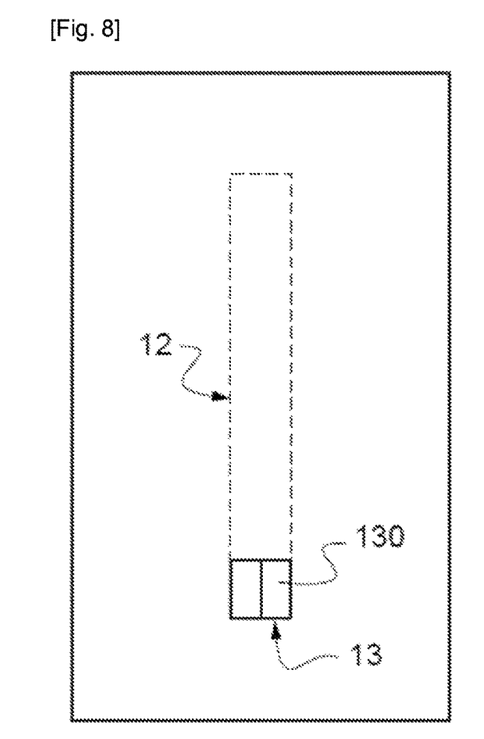

In a variant visible in FIGS. 7 and 8, two strain gauges 131 are used. These two strain gauges 131 are arranged to make it possible, during the movement consisting of spreading a coating E, to better characterize the stress exerted. Indeed, it is possible to have the two strain gauges 131 stretched or crushed in the same way or to have a strain gauge 131 undergoing crushing while the other strain gauge undergoes elongation.

Figure 9:
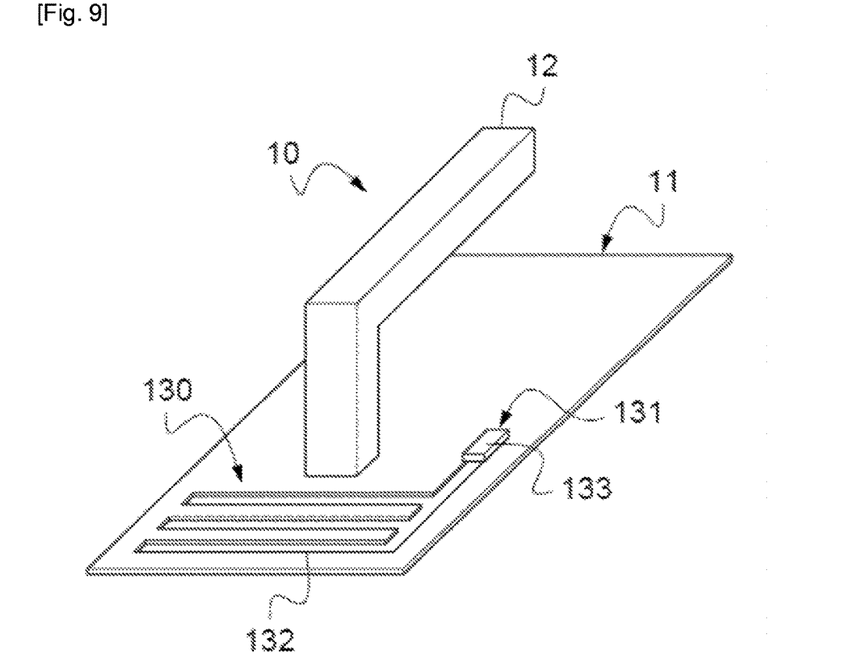
FIG. 9 shows an instrument for determining the capacity of a coating to be spread according to a third embodiment.

In a third embodiment seen in FIG. 9, the strain gauge 131 is arranged on the plate. Indeed, during the step of spreading the coating, a deformation of the plate appears. This deformation comes from the fact that the user, in order to spread the coating, tends to scrape the plate of the trowel on the surface to be coated. This scraping causes the appearance of strains on the plate 11 between the usage movement and the friction of the scraping, which tend to oppose this movement. The deformation is thus done along an axis perpendicular to the direction of the spreading movement.

In this case, the force sensor 130 is arranged to detect this deformation. A strain gauge 131 used in this third embodiment comprises the form of a wire 132 arranged in a multitude of parallel portions. These parallel portions are connected to one another by curved portions. The wire 132 is connected to a control unit 133 of the measuring module 13. Preferentially, the strain gauge 131 is arranged on the plate so that the parallel portions are parallel to the second direction of the plate 11. This second direction is also the direction in which the trowel is set in motion to spread the coating.

Figure 12A:
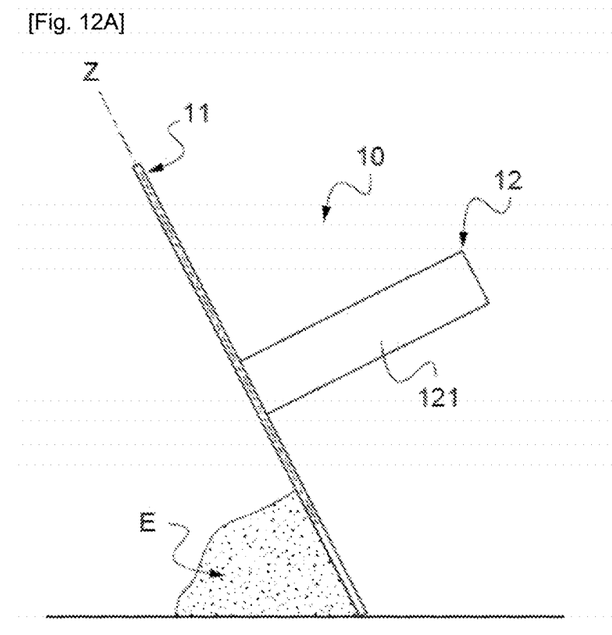
FIGS. 12a and 12b show the position of the instrument according to the third embodiment before and during the spreading step.
Figure 12B:
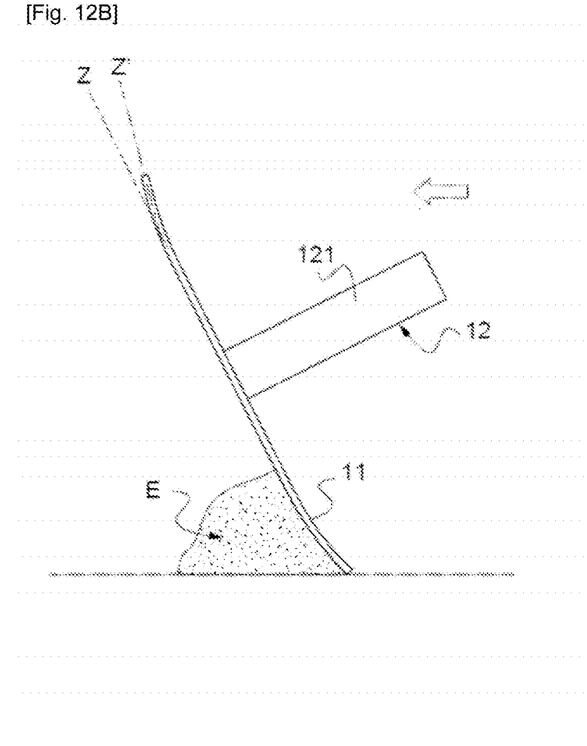

It is possible to observe the operation of the force sensor of this third embodiment in FIGS. 12a and 12b. FIG. 12a shows the instrument 1 according to the invention placed in a spreading position while FIG. 12b shows this same instrument subjected to the user's strain. FIG. 12a shows the axis Z of the pillar 121. FIG. 12b shows that, under the effect of the strain exerted by the user, the axis Z of the pillar becomes the angularly-offset axis Z'. This offset comes from the strain that tends to crush the pillar 121.

In a variant, the wire 132 is arranged in the plate 11. Indeed, the plate can be made from a plastic or rubber material. Such a material makes it possible to overmold the wire 132 of the strain gauge 131.

The measuring module 13 thus provides data making it possible to compare the spreading of different coatings. Indeed, the testing of the different coatings consists of spreading, on a reference surface, an identical quantity of coating. This test makes it possible, for each coating, to recover data. These data are in particular data relating to the force exerted on the trowel by the user. These data relating to strain are performed temporally. It is thus understood that the measurements taken by the strain gauges 131 are carried out at regular intervals. This makes it possible to track changes in the strain applied by the user on the trowel during the step of spreading the coating. Force curves are obtained as a function of time, such as those illustrated in FIG. 13. These curves C are thus studied to determine which coating is the easiest to spread.

Figure 13:
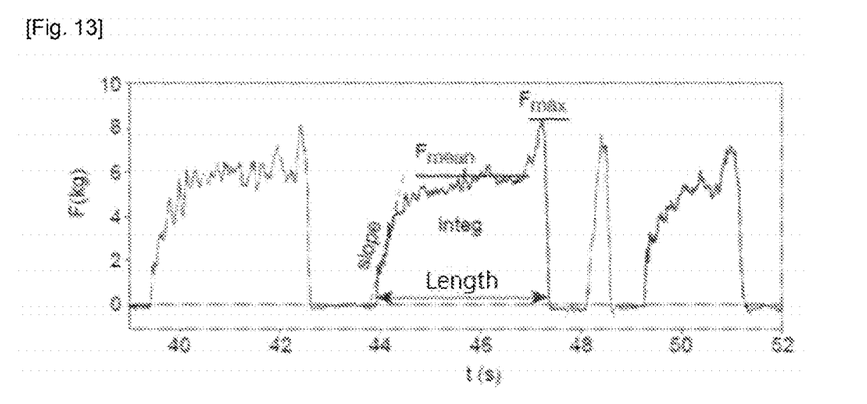
FIG. 13 shows an example of a diagram of the data received by the instrument according to the invention.

Studying these curves C shows several characteristics of the spreading step. Indeed, it is possible to extract data regarding the maximum force of the peak, the average force of the plate, the duration of the gesture, the jerkiness, the number of gestures (=number of peaks) per m2 covered, the number of gestures per minute.

Indeed, it is considered that all these quantities can represent the force that the applicator must apply in order to spread the coating, the mortar.

For example, the number of peaks corresponds to the number of gestures necessary to spread the coating. It is assumed that a large number of gestures means that the coating is more difficult to spread because it requires more gestures.

On the other hand, it is assumed that the number of gestures per minute is indicative of a capacity, of an ease of the coating E to be spread. Indeed, a coating E that is difficult to spread requires, with equal force, a duration to be spread that is greater. Consequently, if the measuring module 13 detects a greater number of movements, then this means that the user more easily spreads the coating. This item of data relative to the number of gestures per minute is to approximate the item of data concerning the duration of the peaks. Indeed, if the duration of the peaks is long, this may mean that the number of peaks per minute will decrease, which means that the coating E is more difficult to spread. This may also mean that the movements of the user are wide therefore much more surface is coated with a single gesture. But this may also mean that the movement is slow and therefore that the operation consisting of spreading the coating is more difficult. Combining with speed or acceleration information can make it possible to understand better.

Regarding the maximum force of the peak, the average force of the plate and the jerkiness, that is the slope of the force of each peak, these data can also be interpreted to enable an analysis of the coating E and its capacity to be spread. Indeed, the data on the measured maximum or average force makes it possible to determine the capacity of the coating to be spread. The higher the average or maximum force, the more difficult the coating is to spread because it requires a greater force to be spread.

As regards the stroke corresponding to the slope of the force as a function of time of each peak, this value also makes it possible to assess the ability of the coating to be spread. Indeed, it is assumed that the less capacity a coating E has to be spread, the smaller the slope. This is due to the viscosity of the coating E that will be lower and which therefore has a greater resistance to spreading.

It is also possible to approximate the amount of energy expended by the operator. This energy is approximated using the following formula:

$$W_i = \int F_i \, dl = \int F_i\left(\frac{dl}{dt} dt\right) = V_{gesture} \int F_i \, dt$$

Where dl=distance from where the gesture i is applied
The result is:

$$W_{total} = \sum_i W_i$$

These data can be analyzed by the user or by computer in order to compare the data for each coating and to determine the coating that appears to be the easiest to spread.

Figure 14A:
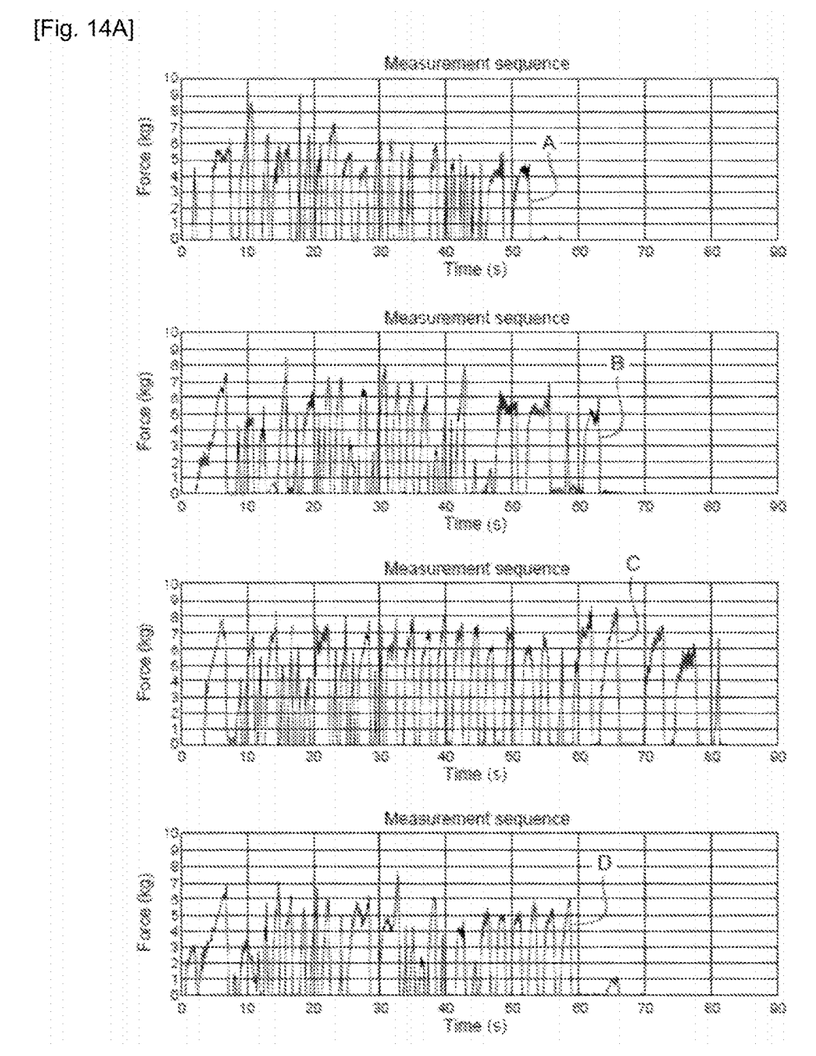
FIGS. 14a and 14b show diagrams enabling the comparison of coatings to one another.
Figure 14B:
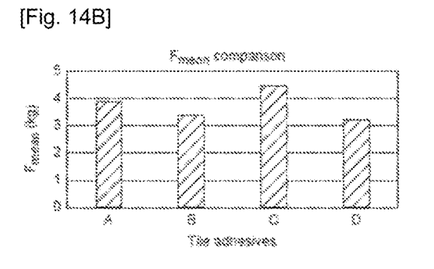

FIG. 14*a* shows curves of the force as a function of time for four coatings A, B, C (standard coating) and D. FIG. 14*b* illustrates the mean forces calculated for each coating. This makes it possible to observe that the standard coating C is that which has the highest average force, so it requires more force to be spread. Furthermore, it is noted that the coating C requires a longer spreading step (80 seconds vs. 70 seconds or less for the coatings A, B and D).

Though these data make it possible to compare the coatings, it is possible to use them for other applications.

A second possible application is the use of these data of maximum force, average force, and number of gestures per minute to compare the surfaces to be coated. This is because although these data can be used to compare different coatings on a reference surface, the inverse consisting of comparing different surfaces to be coated with a reference coating E is possible. This possibility comes from the fact that each material used as a substrate on which a coating E is spread has its own surface characteristics, in particular the surface state characteristics.

In this case, the use of the data is similar since the greater the force needed to spread the coating, the less conducive the surface is to the spreading of a coating E.

Figure 16:
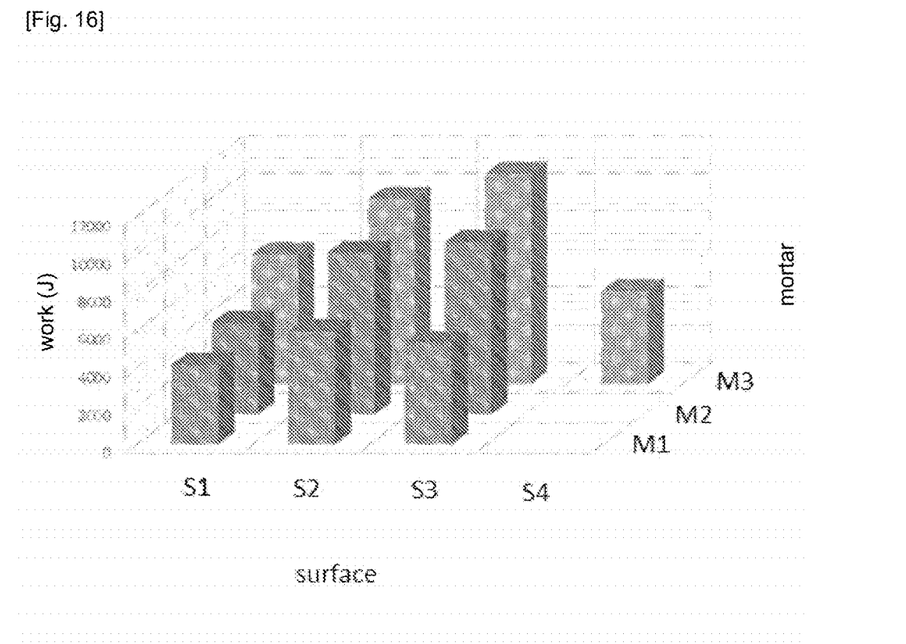
FIG. 16 shows a diagram comparing mortars and surfaces made with the instrument according to the invention.

It is also possible to make multiple comparisons associating different mortars and different surfaces or substrates. FIG. 16 thus shows the energy expended by an operator for different mortars for different surfaces. In this FIG. 16, it can be seen that mortar M3, for each of the surfaces S1, S2, S3, requires more energy to be spread than mortar M2, which in turn requires more energy than mortar M1. Furthermore, looking at mortar M2, it is possible to note that surface S3 requires more energy than surface S2, which in turn requires more energy than surface S1.

Another application consists of using the instrument 1 according to the invention to monitor the users well-being. This need for well-being comes from the fact that handling a spreading tool like a trowel can be exhausting for the user if the coating or the surface causes difficulty in spreading the coating. This difficulty means the user needs to force the movement of their wrist or to spend more time spreading the coating. As a result, the user may experience discomfort.

According to the invention, the data relating to the stress applied for the spreading of a coating E can be used to provide an indication of comfort. For this, the data relating to the maximum or average force applied by the user to perform the spreading of the coating. It is then understood that if the maximum force and/or the average force exceeds a predefined threshold, then the spreading is considered uncomfortable and an indication of this discomfort is transmitted. This indication may be a sound or vibration or light signal. For this, the instrument according to the invention comprises a light or vibration or sound device to enable this indication.

To measure the discomfort of said instrument, said instrument can further comprise other sensors.

In a first example, the instrument 1 further comprises an inclination sensor. This inclination sensor is, for example, a gyroscope installed on a pillar 121. This inclination sensor is thus able to measure the angle between the ground plane and the pillar in order to see the inclination of the latter. The inclination sensor then measures the amplitude of the inclination adopted by the instrument during the spreading operation. This amplitude is representative of the user's wrist movement. Thus, a large amplitude measured means that the user's wrist is subjected to heavy load. The repetition of such a load can cause discomfort, or even musculoskeletal disorders, to emerge. For example, having an angular amplitude greater than 90 degrees can cause an alert signal to appear. Thus, the association of a movement amplitude and a duration makes it possible to detect an uncomfortable or comfortable movement.

This amplitude may also be associated with the (maximum, average) force values. It is thus assumed that the more difficult the coating E is to spread (force needed to spread the coating is high) the more the operator will tend to force their movement and therefore the amplitude will increase.

In a second example, another characteristic representative of comfort is the weight of the coating E used. Indeed, the user who coats a surface sometimes uses the plate 11 of the tool used to spread such as the trowel as an application surface to place the coating E thereupon before spreading it. However, if the mass is too high, the sensation of heaviness can be perceived on the user's wrist, which can lead to muscle fatigue and therefore lower effectiveness in the spreading of the coating.

The plate 11 then serves as a scale since the mass of coating can be measured using the force sensor 130 arranged on at least one of the pillars.

Thus, by defining a threshold from which the mass of coating E placed on the plate 11 can cause a hindrance, it becomes possible to compare the measured value to this threshold value in order to then transmit an alert signal in sound or light form.

According to a third example, the concept of comfort is related to the ease of a coating to be spread, also depends on the quantity of coating to be spread. Indeed, the ease of spreading a coating varies depending on the quantity of coating that the user deposits on the surface to be coated, the greater this quantity, the more comfort is degraded, but if the quantity is too low then the effectiveness of the spreading will be low. This comes from the fact that an amount X of coating requires more force from the user to spread than a quantity X/2.

The present invention is thus capable of determining whether the quantity of coating E taken by the user is optimal. For this, the force sensor 130 is used to measure the force applied by the user on the trowel to spread the coating. This measured force is thus compared with a reference value. This reference value may be data known from the manufacturer or may be a value determined by the trowel itself. This self-determination of the reference value by the trowel consists of a continuous analysis of the force applied. Indeed, it is conceivable that, for a given coating, the force applied to the trowel to spread the coating E can vary depending on the user and their morphology. Thus, the control unit 133 of the measuring module 13 is able, via an algorithm, to measure the force continuously or at regular intervals. This measurement continuously or at regular intervals is analyzed by said control unit 133 to extract the quantity of optimal coating E therefrom.

The control unit 133 is also able to extract a user profile P and to be saved. This user profile P is representative of the user's way of spreading. This profile comprises in particular an indication on the average value of the force and a maximum value, curves C, that is the force as a function of time, or even data on the inclination. This profile P can be supplemented or refined using the second example. In the second example, the instrument is able to measure the quantity of coating by measuring the weight of the coating when it is placed on the trowel plate. This weight measurement can thus be correlated with the force measured during the step of spreading the coating. Indeed, the algorithm of the control unit 133 is capable of associating the measurement of the weight of the coating with that of the force required to spread this weight, in order to precisely determine the behavior of the user, in particular the value of the average force which can, for a given coating, vary according to the user.

This profile P then makes it possible to serve as a reference. Thus, by continuously measuring the force applied by the user on the instrument according to the present invention, the control unit 133 can compare the force values subsequently measured to the reference profile P. The algorithm of the control unit 133 is then capable of detecting variations in the force values. These variations can be analyzed so that excessively large variations are considered to be the sign that the quantity of coating to be spread is too great.

Of course, the user profile P is such that it changes, that is, it is populated during the user of the tool with the measured data to be refined.

The control unit 133 is then able to generate an alert signal in light or sound form. For this, the control unit 133 can comprise a communication module sending the alert signal to a mobile terminal or a signaling module generating an audio and/or light signal.

It is also possible that a theoretical ideal profile is recorded. This theoretical ideal profile comprises the average value of the force and a maximum value, curves C, or even data on the inclination. This profile P can be supplemented or refined using the second example Of course, the present invention is not limited to the illustrated example, but is capable of various variants and modifications that will appear to those skilled in the art.

Indeed, the measuring means 13 may comprise other types of sensors. These other types of sensors are speed or acceleration sensors. These sensors then make it possible to obtain data relating to the speed and acceleration of the instrument during the spreading step. These data are useful because they are representative of the movement performed by the user to spread the coating. Thus, it is assumed that the greater the acceleration and/or the speed measured, the simpler the coating is to spread since the consistency of the coating does not slow down the movement of the user.

Furthermore, it is also possible that the data of the measuring means be used to extract, from a force and a speed as a function of time, an amount of work, that is to say, the energy expended by the user.

In the case of measuring means 13 having several sensors, it is possible to have one sensor arranged on the pillar and another in the pillar or one sensor on the plate and another on the pillar, the different sensors being able to be installed differently.

The invention claimed is:

1. An instrument for determining a spreading capacity of a coating or a surface comprising:
    a plate for spreading the coating,
    a grip connected to the plate,
    a measuring system configured to measure the coating to be spread, wherein said measuring system comprises at least one force sensor for sensing a force during a spreading gesture that spreads the coating and a controller coupled to the force sensor and arranged for generating data relating to an average force sensed during each spreading gesture, a maximum force sensed during each spreading gesture, and a duration of each spreading gesture,
    wherein said controller is further arranged to process said data and provide a signal representative of the spreading capacity of the coating to be spread or of the surface to be coated based on said average force, said maximum force, and said duration of each spreading gesture.

2. The instrument according to claim 1, wherein the measuring system is further configured to measure a mass or weight of the coating on the plate.

3. The instrument of claim 2, wherein said controller is further configured to also process data relating to the mass or weight of the coating as part of processing said data and provide said signal representative of the spreading capacity.

4. The instrument according to claim 1, wherein the measuring system is further configured to measure an inclination of the instrument.

5. The instrument according to claim 1, wherein the measuring system is further configured to measure speed or acceleration of said instrument.

6. The instrument according to claim 5, wherein the grip comprises at least one pillar extending from the plate and a handle extending from the pillar.

7. The instrument according to claim 6, wherein the grip comprises two pillars connected by the handle.

8. The instrument according to claim 7, wherein the force sensor is a deformation gauge.

9. The instrument according to claim 5, wherein the force sensor is arranged on or in at least one pillar of the grip or arranged on or in the plate or arranged between the plate and the at least one of the pillar of the grip.

10. The instrument of claim 5, wherein said controller is further configured to also process data relating to the speed or acceleration of the coating as part of processing said data and provide said signal representative of the spreading capacity.

11. The instrument according to claim 1, wherein the controller is adapted to generate an alert signal in light or sound form.

12. A method for determining a spreading capacity of a coating or a surface comprising:
   providing a coating;
   providing an instrument for determining the spreading capacity of the coating or surface comprising: (a) a plate for spreading the coating, (b) a grip connected to the plate, said tool comprising a measuring system configured to measure the coating to spread including at least one force sensor for sensing a force during a spreading gesture that spreads the coating and a controller coupled to the force sensor;
   placing said coating on the surface to be coated;
   spreading said coating using said instrument;
   said controller of said measuring system generating data during said spreading relating to an average force sensed during each spreading gesture, a maximum force sensed during each spreading gesture, and a duration of each spreading gesture, and
   wherein said controller also processes said data and provides a signal representative of the spreading capacity of the coating to be spread or of the surface to be coated based on said average force, said maximum force, and said duration of each spreading gesture.

13. The method according to claim 12, wherein the measuring system is arranged to measure a mass or weight and wherein said method comprises, before placing the coating on the surface to be coated, placing the instrument in a position such that a surface area of the plate used for the spreading can be used for the temporary storage of coating, and measuring the mass or weight of the temporarily stored coating.

14. A method according to claim 13, further comprising:
   after said controller generating said data during said spreading, determining an optimal amount of coating to be placed on the instrument, wherein said determination is based on at least one maximum force as sensed and said mass or weight value as measured.

15. The method according to claim 13, further comprising said controller also processing data relating to the mass or weight of the coating as part of processing said data and providing said signal representative of the spreading capacity.

16. The method according to claim 12, wherein the measuring system is arranged to measure an inclination and wherein said controller of said measuring system, during the spreading of the coating, further generates data relating to an inclination of said instrument.

17. The method according to claim 16, further comprising the controller combining an inclination value of the instrument with at least one maximum force and/or time value and in order to detect mishandling of the instrument.

18. A method for comparing the spreading capacity of different coatings, comprising:
   providing at least two different coatings;
   providing a surface on which the coatings are spread;
   determining the spreading capacity of each coating by using the method according to claim 12 in order to obtain, for each coating, a signal representative of the capacity of said coating to be spread based on said average force, said maximum force, and said duration of each spreading gesture, and
   comparing signals representative of the capacity of the coatings to be spread.

19. A method for comparing the capacity of different surfaces to undergo spreading, comprising:
   providing at least two different surfaces;
   providing a coating to be spread;
   determining the spreading capacity of each coating by using the method according to claim 12 in order to obtain, for each surface, a signal representative of the capacity of the coating to be spread based on said average force, said maximum force, and said duration of each spreading gesture, and
   comparing signals representative of the capacity of the surfaces to undergo spreading.

20. The method according to claim 12, further comprising generating a user profile using at least the data relating to the average force, the maximum force, and the duration, and saving said profile in the control unit.

21. The method according to claim 20, wherein the user profile is used as a reference and compared to a subsequent measurement of at least the average force applied on said instrument, the maximum force applied on the instrument, the and duration.

* * * * *